Figure 1:
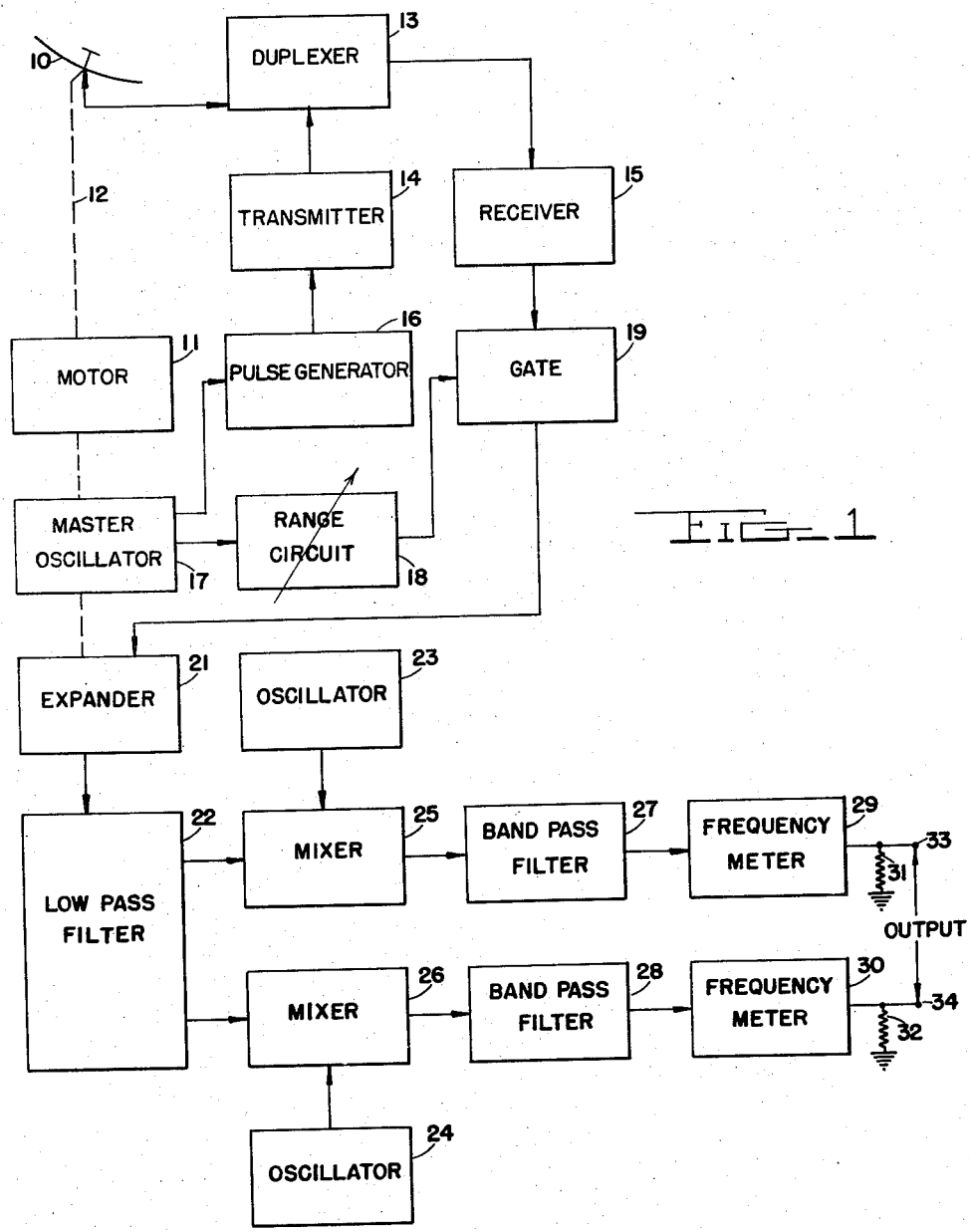

Feb. 17, 1959    R. M. PAGE    2,874,379
RADIO ECHO RANGING AND DIRECTION FINDING SYSTEM
Filed Nov. 15, 1945    4 Sheets-Sheet 2

Inventor
ROBERT M. PAGE
By Ralph L. Chappell
Attorney

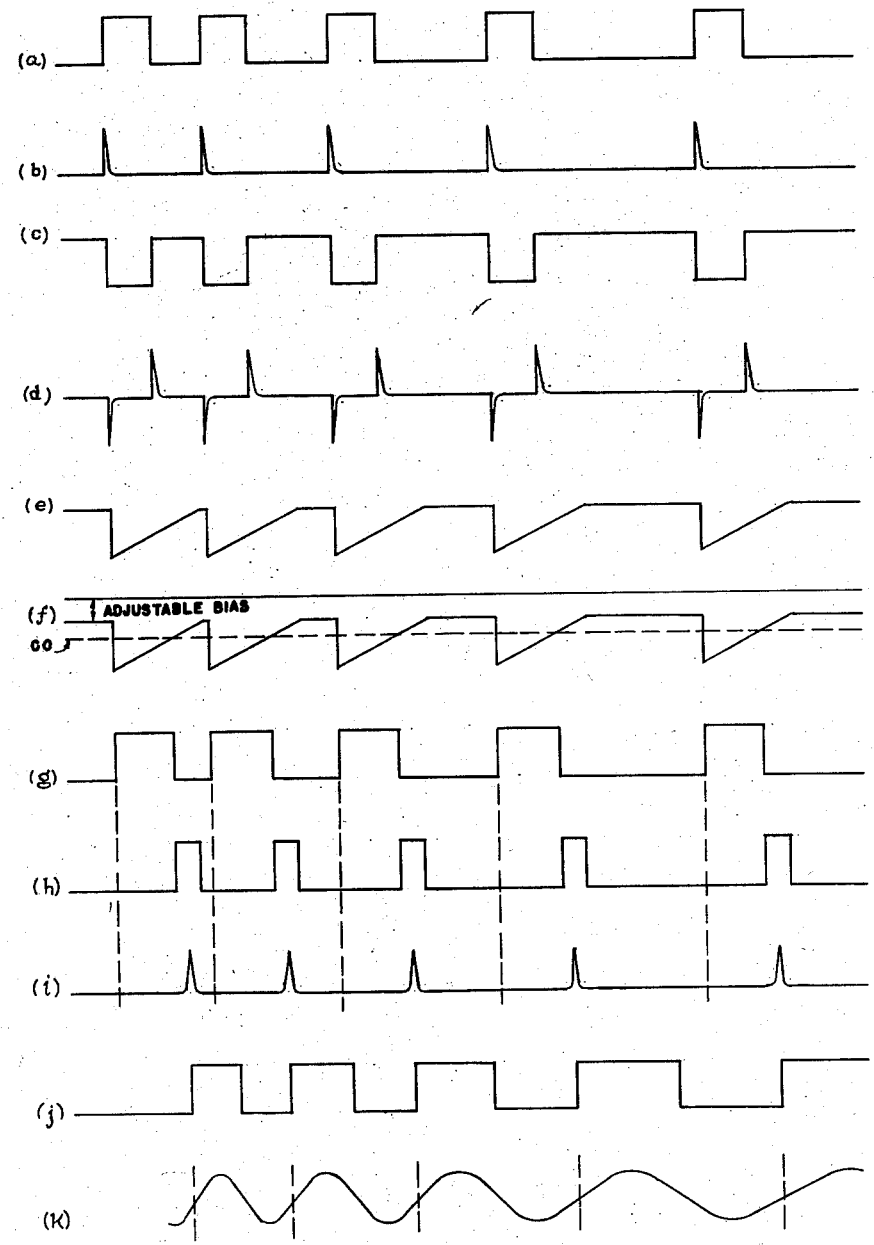

Feb. 17, 1959 R. M. PAGE 2,874,379
RADIO ECHO RANGING AND DIRECTION FINDING SYSTEM
Filed Nov. 15, 1945 4 Sheets-Sheet 4
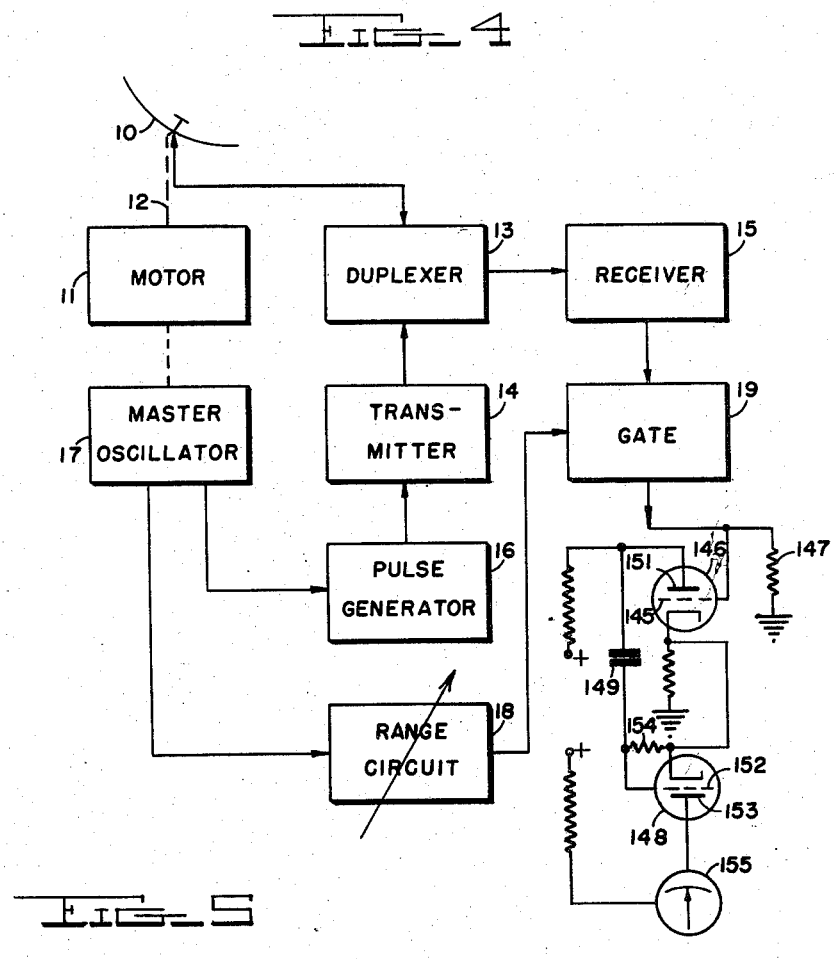
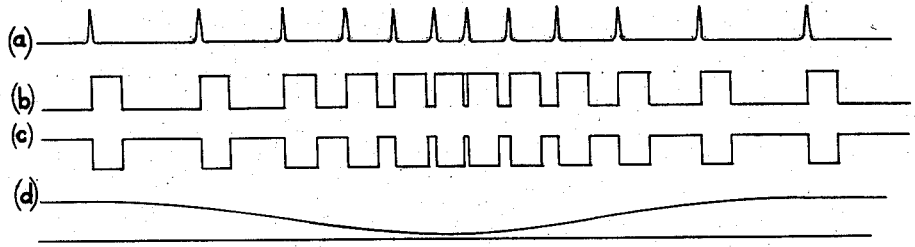
Inventor
ROBERT M. PAGE

United States Patent Office 2,874,379
Patented Feb. 17, 1959

2,874,379

RADIO ECHO RANGING AND DIRECTION FINDING SYSTEM

Robert M. Page, Washington, D. C.

Application November 15, 1945, Serial No. 628,952

7 Claims. (Cl. 343—11)

(Granted under Title 35, U. S. Code (1952), sec. 266)

This invention relates to a radio echo ranging and direction finding system employing a scanning antenna, and more particularly to such a system providing an output voltage proportional to the bearing in azimuth of the target measured from the antenna mount.

It is one object of the present invention to provide a radio echo ranging and direction finding system which employs recurrent electromagnetic energy pulses modulated in synchronism with the rotation in azimuth of a singular directional characteristic of the scanning antenna.

It is another object of the invention to provide such a system in which the pulse repetition rate is modulated in synchronism with the azimuth rotation of a singular directional characteristic of the scanning antenna.

It is a further object of this invention to provide such a system in which the indication of the bearing of the target from the antenna mount can be used for information, automatic tracking, or derivation of bearing rates.

Figure 2:
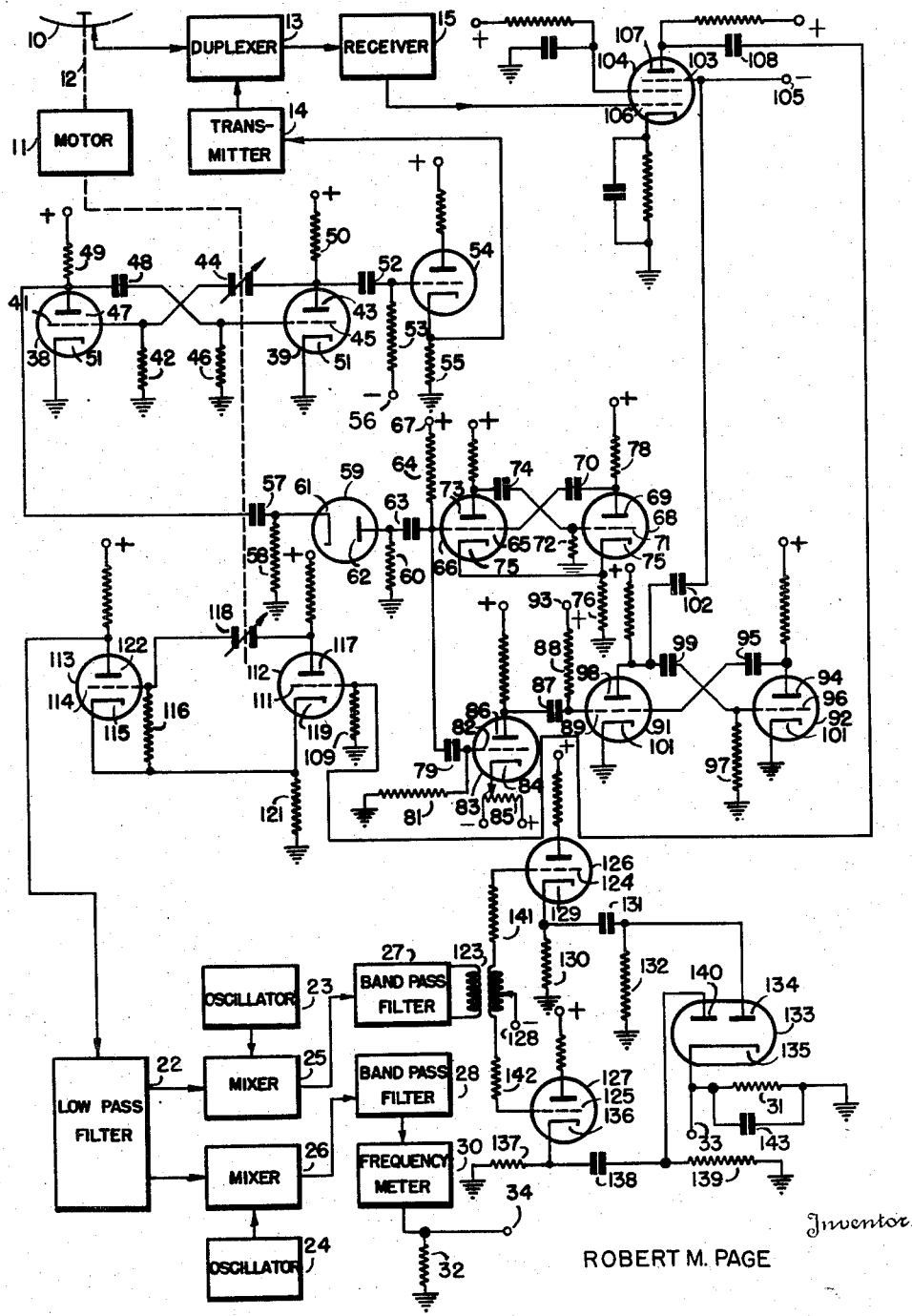

This invention will be described with reference to the exemplary embodiment shown in the drawings, in which:

Figure 1 is a diagrammatic representation of one embodiment of this invention,

Figure 2 shows a schematic representation of certain of the component parts of the embodiment of Figure 1, Figure 3 shows the waveforms of various voltages which are present in the operation of the embodiment of Figure 1, Figure 4 shows a representation, in part diagrammatic and in part schematic, of another embodiment of this invention, and Figure 5 shows the waveforms of various voltages and currents which are present in the operation of the embodiment of Figure 4.

In Figure 1, scanning antenna 10 is a directional antenna having a singular directional characteristic.

Antenna 10 is rotated in azimuth by means of motor 11 acting through shaft 12. The antenna is connected through duplexer 13 to pulse transmitter 14 and radio echo receiver 15.

In the embodiment of Figure 1, the repetition rate of the recurrent electromagnetic energy pulses produced by transmitter 14 is controlled by the repetition rate of the trigger pulses from pulse generator 16. The repetition rate of pulse generator 16 is in turn determined by the frequency of a control signal from master oscillator 17. The frequency of master oscillator 17 is varied by motor 11 through an extension of shaft 12 in synchronism with the rotation in azimuth of antenna 10 so that for any direction in which antenna 10 may point there is a single frequency of oscillator 17 corresponding thereto. In other words, the pulse repetition rate of transmitter 14 is modulated in synchronism with rotation of antenna 10.

A control signal from master oscillator 17 is also fed to range circuit 18. The latter controls gate 19, into which are fed the radio echo signals from receiver 15. An adjustment made in range circuit 18 determines which of several targets present is to be chosen for tracking.

The echo signals from the target chosen are then allowed to pass to expander 21 through gate 19, while echo signals from other targets are rejected by the gate.

In the embodiment of Figure 1, expander 21 converts the narrow echo pulses which are passed through gate 19 into a symmetrical rectangular wave whose frequency at any instant is equal to the frequency of master oscillator 17 at that instant. Since the frequency of master oscillator 17 is modulated synchronously with the rotation of antenna 10, it follows that the frequency of the rectangular wave from expander 21 at any instant is uniquely characteristic of the target's azimuth bearing from the antenna mount at that instant.

The symmetrical rectangular wave voltage from expander 21 is applied to low pass filter 22 which is designed to pass all sine wave voltages having frequencies up to slightly more than the maximum frequency of master oscillator 17 and expander 21. The minimum frequency at the lower limit of the frequency range swept by master oscillator 17 and expander 21 is chosen to be somewhat greater than one-third the maximum frequency of oscillator 17 and expander 21.

The symmetrical rectangular wave voltage from expander 21 may be considered at any instant to be constituted of an infinite series of sine wave voltages of various amplitudes and of frequencies including all the odd harmonics of the frequency of the rectangular wave at that instant. Therefore, it follows that low pass filter 22 is operative to pass only the fundamental sine wave component of the rectangular wave voltage applied at any instant from expander 21. Moreover, it will be seen that the frequency of this fundamental sine wave voltage from low pass filter 22 is at any instant uniquely characteristic of the target's azimuth bearing from the antenna mount.

In the embodiment of Figure 1, the voltage from low pass filter 22 having the average frequency in the range covered by master oscillator 17 and expander 21 is chosen to indicate zero bearing of the target from the antenna mount. It will be seen that a frequency meter having an output voltage proportional in amplitude and sign to the deviation from this average frequency can be calibrated to give a direct indication of the bearing of the target from the antenna mount.

In the embodiment of Figure 1, components 23 through 34 represent such a frequency meter. Oscillator 23 produces a sine wave output voltage having a frequency somewhat above the upper limit of the frequency range from oscillator 17, and oscillator 24 produces a sine wave output voltage an equal amount below the lower limit. The signals from oscillators 23 and 24 are mixed with the sine wave voltage from low pass filter 22 in mixers 25 and 26, respectively. The resulting sum and difference frequency voltages are applied to band pass filters 27 and 28, which are tuned to pass only the difference frequency voltages. The output voltages from band pass filters 27 and 28 are applied to frequency meters 29 and 30, respectively, which produce output voltages directly proportional to the frequencies of the voltages applied. The output voltage from frequency meters 29 and 30 are applied in series opposition across resistors 31 and 32, which have their junction point grounded, and the resulting voltage is taken off between terminals 33 and 34, as shown.

It will be seen that the output voltage across terminals 33 and 34 is proportional in amplitude to the amount of frequency deviation in the output voltage of low pass filter 22 from the average frequency of master oscillator 17, and that the sign of the voltage between terminals 33 and 34 will also indicate the sign of said frequency deviation. It follows that the output across these terminals will give a unique indication in magnitude and sign of the bearing of the target in azimuth measured from the antenna mount.

Figure 2 shows schematically certain of the component parts of the embodiment of Figure 1 which are shown diagrammatically in the latter figure. These component parts will now be further described with reference to Figure 2.

Master oscillator 17 is a free-running asymmetric multivibrator comprising electron tubes 38 and 39. Control grid 41 of tube 38 is returned to ground through resistor 42, and is coupled to anode 43 of tube 39 through variable capacitor 44. Control grid 45 of tube 39 is returned to ground through resistor 46, and is coupled to anode 47 of tube 38 through fixed capacitor 48. Anode 47 is returned to a positive voltage source through load resistor 49 and anode 43 of tube 39 is returned to a positive voltage source through load resistor 50. The cathodes 51 of the two tubes are grounded.

The regenerative action introduced by the above described coupling of control grids to anodes produces the usual rapid switching action of a multivibrator from one tube to the other, and thus a rectangular wave voltage is produced at the anodes of both tubes.

The length of the more positive portion of a cycle of the rectangular wave voltage at anode 43 of tube 39 is constant, being determined by the RC time constant of the discharge path comprising fixed capacitance 48, resistance 46, and the resistance across tube 38 while it is conducting. The length of the less positive portion of a cycle of the rectangular wave voltage at anode 43 of tube 39 varies, however, from one cycle to the next, being determined by the RC time constant of the discharge path comprising variable capacitance 44, resistance 42, and the resistance across tube 39 while it is conducting. Capacitance 44 is varied by operation of motor 11 acting through shaft 12 in such a way that the total period of successive cycles of multivibrator 17 varies in synchronism with the rotation of antenna 10, and each such period is uniquely characteristic of the orientation in azimuth of antenna 10 at that instant.

Variable capacitor 44 may be any condenser whose capacitance can be controlled by movement of one element of the capacitor with respect to the other elements thereof. If one plate or set of plates is rotated by shaft 12, for example, the plates may be so shaped as to produce the desired frequency variation in the output voltage from master oscillator 17.

The positive voltage swing at anode 43 of tube 39 is employed to determine when transmitter 14 is keyed into operation. For this purpose, the rectangular wave voltage from anode 43 is differentiated through capacitor 52 and across resistor 53, and the resulting pulses are applied to cathode follower tube 54. Tube 54 comprises pulse generator 16. The output from this stage is taken off across cathode resistor 55 and applied to transmitter 14 where it triggers the keying circuit and causes transmitter 14 to go into operation.

Grid resistor 53 of cathode follower 54 is returned to negative potential source 56 so that the tube is biased at the plate current cutoff point. This results in clipping off the negative pulses which are produced by the differentiator network of capacitor 52 and resistor 53 when the voltage at anode 43 of tube 39 swings in a negative direction. Also, the keying circuit of transmitter 14 is designed to be insensitive to any small negative pulses which may appear in the output voltage of pulse generator 16.

The negative going swing in the voltage at anode 47 of tube 38 is employed to trigger range circuit 18, which is used to choose that one of several targets present at various ranges which is to be tracked. The voltage at anode 47 is differentiated through capacitor 57 and across resistor 58 in parallel with the series combination of diode 59 and resistor 60, as shown. As will be seen, when anode 47 of tube 38 swings negative, cathode 61 of tube 59 will go negative with respect to anode 62 and tube 59 will conduct. The flow of electrons through resistor 60 will cause a negative voltage pulse to be applied to coupling capacitor 63. Capacitor 63 has a small capacitance so the negative voltage pulse across resistor 60 is differentiated through capacitor 63 and across resistor 64, which returns control grid 65 of electron tube 66 to positive potential source 67.

When anode 47 of tube 38 swings positive, a positive voltage pulse is applied to cathode 61 of diode 59, so the diode does not conduct and no voltage pulse is applied to control grid 65.

Electron tubes 66 and 68 comprise a one-shot multivibrator which is a part of range circuit 18. As stated, control grid 65 of tube 66 is returned to positive potential source 67 through resistor 64; it is also coupled to anode 69 of tube 68 through capacitor 70. Control grid 71 of tube 68 is returned to ground through resistor 72 and is coupled to anode 73 of tube 66 through capacitor 74. Cathodes 75 of tubes 66 and 68 are connected and are returned to ground through a common cathode resistor 76. Because it is returned to positive potential source 67, control grid 65 of tube 66 normally has a slight positive bias with respect to cathode 75, causing tube 66 to conduct. This produces a voltage across resistor 76 which holds control grid 71 of tube 68 biased below the plate current cutoff point.

When a negative voltage pulse is impressed upon control grid 65 of tube 66, that tube is cut off. The voltage at anode 73 of the tube therefore swings positive, and this positive voltage swing is transmitted through capacitor 74 to grid 71 of tube 68, causing that tube to begin conducting. This lowers the plate voltage at anode 69 of tube 68 because of the current flowing through plate load resistor 78. This negative voltage swing is transmitted through capacitor 70 to control grid 65 and drives that grid well below the plate current cutoff point. The switching action described occurs very rapidly, of course, because of the regenerative feedback in the multivibrator circuit.

Capacitor 70 immediately begins to discharge through grid resistor 64, the voltage on control grid 65 rising exponentially toward the potential of positive voltage source 67. This exponential increase in grid voltage continues until tube 66 begins to conduct again, and the multivibrator returns to its normal condition with a slight positive bias on grid 65 of tube 66. The capacitance of capacitor 63 is very much smaller than that of capacitor 70, so the effect of capacitor 63 on the exponential rise in voltage on grid 65 is negligible.

Since the variations in the voltage on grid 65 follow only the first part of an exponential discharge path, the resulting sawtooth wave voltage possesses quite a linear trailing edge. This sawtooth voltage wave is applied through coupling capacitor 79 and across resistor 81 to control grid 82 of electron tube 83. Tube 83 is also a part of range circuit 18. Its grid resistor 81 is grounded and its cathode 84 is returned to variable voltage source 85, thus providing adjustable grid bias for the tube.

The sharp negative voltage swing comprising the leading edge of the sawtooth wave voltage that is applied to control grid 82 of tube 83 drives grid 82 below the plate current cutoff point. The rising voltage of the trailing edge of the sawtooth wave voltage brings tube 83 back into conduction after a time interval which is determined by the original bias on grid 82. Since this original bias is adjustable, the operator of the system can select the time interval desired after which tube 83 will return to conduction.

The negative swing in the voltage on anode 86 of tube 83 accompanying the return to conduction of tube 83 is employed to open gate 19 so that echo voltage pulses from receiver 15 will be transmitted to expander 21. Thus, adjustment of the bias on grid 82 of tube 83 will determine at any instant the minimum range of a target for which an echo voltage pulse will appear in the output of receiver 15.

For the purpose of opening gate 19, the negative voltage swing at anode 86 of tube 83 is differentiated through capacitor 87 and across resistor 88, causing a negative trigger pulse to appear on control grid 89 of electron tube 91. Electron tubes 91 and 92 comprise a multivibrator which is part of gate 19. Control grid 89 of tube 91 is returned to positive potential source 93 by resistor 88, and is also coupled to anode 94 of tube 92 by capacitor 95. Control grid 96 of tube 92 is returned to ground through resistor 97, and is coupled to anode 98 of tube 91 through capacitor 99. The cathodes 101 of the two tubes are grounded.

Since control grid 89 of tube 91 is returned to a positive potential source, there is normally a slight positive bias on grid 89 and tube 91 is normally conducting. When a negative trigger pulse is applied to grid 89, conduction ceases in tube 91 and the voltage at anode 98 swings positive. This positive voltage swing is transmitted to control grid 96 of tube 92, causing that tube to begin conduction. This produces a negative voltage swing at anode 94 of tube 92, which is transmitted to control grid 89 of tube 91 and operates to hold tube 91 cut off for a time. The length of time tube 91 remains cut off is determined by the time constant of capacitor 95 and resistor 88 and the resistance of tube 92 while it is conducting. Capacitor 87 is so small that its effect on the voltage at control grid 89 may be ignored. As soon as the voltage on grid 89 has risen to the cutoff point, conduction switches rapidly from tube 92 to tube 91 and the voltage at anode 98 of tube 91 swings negative.

It will be seen that the voltage at anode 98 of tube 91 has the form of a positive gate which opens at a time selected by adjustment of variable voltage source 85 and closes at a time determined by the time constant of capacitor 95 and resistor 88 and the resistance of tube 92 while it is conducting. This positive gate voltage is impressed through coupling capacitor 102 onto suppressor grid 103 of pentode 104. Pentode 104 is also a part of gate 19. Suppressor grid 103 is returned to negative potential source 105, which is of a sufficiently negative voltage that plate current does not normally flow in tube 104. Tube 104 is otherwise a conventional video amplifier stage, to whose control grid 106 are applied the negative voltage pulses from receiver 15 which result from detection of the received electromagnetic energy pulses reflected from the target being tracked.

The resulting positive echo voltage pulses appearing on anode 107 of tube 104 are applied through coupling capacitor 108 across resistor 109 to control grid 111 of electron tube 112. Tubes 112 and 113 are used in a one-shot multivibrator comprising expander 21. Control grid 114 and cathode 115 of tube 113 are connected by means of resistor 116. Control grid 114 is also coupled to anode 117 of tube 112 through variable capacitor 118. Cathode 115 of tube 113 and cathode 119 of tube 112 are connected and are returned to ground through the common cathode resistor 121. Electron tube 113 is normally conducting, since grid 114 is returned to cathode 115. The electron current through resistor 121 produces a voltage which biases tube 112 below the plate current cutoff point while tube 113 is conducting.

The positive echo voltage pulse applied to control grid 111 from gate 19 raises grid 111 above the cutoff point, however, and starts conduction in tube 112. As the voltage on anode 117 decreases due to plate current flow, this negative voltage swing is transmitted to control grid 114 of tube 113, thus reducing the plate current flow in tube 113. This reduces the voltage across resistor 121 and so the negative bias on control grid 111, resulting in increased plate current flow in tube 112 and further reduction in the anode voltage of the tube. This action proceeds very rapidly until tube 112 is conducting heavily and tube 113 is cut off.

The voltage resulting at anode 122 of tube 113 is a rectangular wave voltage which swings positive every time a positive echo voltage pulse is applied to control grid 111, and swings negative as soon as capacitor 118 has discharged enough that the voltage on grid 114 has increased above the cutoff point for tube 113. The capacitance of capacitor 118 is varied by shaft 12 in synchronism with the rotation of antenna 10 in such a way that the negative swing of the voltage on anode 122 always occurs after the expiration of one-half the period of that cycle of the rectangular wave voltage which is being generated by master oscillator 17 at that particular instant. The voltage at anode 122 of tube 113 swings positive again when another positive echo voltage pulse is applied to grid 111 of tube 112, causing tube 112 to resume conduction and tube 113 to be cut off.

Variable capacitor 118 may be of a type similar to variable capacitor 44. If one plate or set of plates is rotated by shaft 12, for example, as antenna 10 is rotated in azimuth, then the plates of the capacitor may be so shaped as to produce the desired one-half period for each cycle of the output of expander 21, as described.

As explained above, the rectangular wave voltage output from tube 113 of expander 21 is applied to low pass filter 22 to remove sine wave voltage components of all frequencies except the fundamental sine wave voltage component thereof. The frequency of this fundamental sine wave voltage component is then measured, as described above, by a frequency meter comprising elements 23 through 34 which is operative to produce an output proportional in sign and amplitude to the deviation from the average frequency of the output voltage from master oscillator 17.

Frequency meters 29 and 30 are operative to produce an output proportional to the frequency of the input voltage. Only frequency meter 29 will be described herein, as they are identical in operation. The sine wave output voltage from band pass filter 27 is applied to the primary of transformer 123. One end of the secondary winding of transformer 123 is connected through resistor 141 to control grid 124 of switch tube 126 and the other end through resistor 142 to control grid 125 of switch tube 127. The secondary center tap of transformer 123 is returned to negative potential source 128 which is of such a value that tubes 126 and 127 are biased just at the plate current cutoff point. Cathode 129 of tube 126 is returned to ground through resistor 130 in parallel with capacitor 131 in series with the parallel combination of resistor 132 and diode 133, as shown in Figure 2. Anode 134 of diode 133 is connected to the junction point of capacitor 131 and resistor 132, and cathode 135 of the diode is returned to ground through resistor 31 in parallel with capacitor 143. Similarly, cathode 136 of tube 127 is returned to ground through resistor 137 in parallel with capacitor 138 in series with the parallel combination of resistor 139 and diode 133, as shown in Figure 2. Anode 140 of diode 133 is connected to the junction point of capacitor 138 and resistor 139.

When the upper end of the secondary coil of transformer 123 goes positive during one half cycle of the sine wave voltage output from band pass filter 27, switch tube 126 conducts. Current flows in the cathode circuit of the tube through resistors 130, 132, and 31, and also through capacitors 131 and 143. The current through capacitor 131 decreases exponentially while switch tube 126 continues to conduct, then falls instantaneously to zero when the voltage on control grid 124 of tube 126 decreases to the cutoff point. The circuit constants are so chosen that after switch tube 126 is cut off capacitor 131 discharges very quickly through resistors 130 and 132. No current flows through resistor 31 during this discharge time because of diode 133.

It will be seen that the longer the period is during which switch tube 126 conducts, the farther the charging current for resistor 31 will fall in its exponential decrease, and therefore the smaller the average current through resistor 31 will be during said conduction period. Conversely the shorter the half cycle of conduction is, the higher the average current through resistor 31.

Switch tube 127 and its associated circuit operate in a manner similar to that described for tube 126 and its associated circuit, except of course that tube 127 conducts when the lower end of the secondary of transformer 123 goes positive. While tube 127 is conducting, a part of the charging current for capacitor 138 flows through resistor 31 just as when tube 126 conducted. Again, the shorter the half cycle of conduction in tube 127 the higher the average current through resistor 31.

From this it follows that the average current flowing in resistor 31 increases with the frequency of the applied signal. Therefore, the average voltage output across resistor 31 also increases with frequency.

The output voltage of frequency meter 29 is taken off terminal 33, which is connected to cathode 135 of diode 133. The output voltage is smoothed out somewhat by the presence of capacitor 143. The output voltage of frequency meter 30, which meter is identical in every way to meter 29, is taken off at terminal 34 across resistor 32.

Terminals 33 and 34 are employed as the final poles across which the output voltage of the system of Figure 1 appears, so the positive voltages across resistors 31 and 32 operate to subtract from each other. Thus, when the target being tracked is at zero bearing from the antenna mount, the voltage across resistor 31 is equal to the voltage across resistor 32, and there is zero output voltage between terminals 33 and 34. But when the target lies to one side of the zero bearing line the average voltage across resistor 31 will be different from the average voltage across resistor 32, so there will be a resultant output voltage across terminals 33 and 34. This output voltage is proportional in sign and magnitude to the bearing of the target from the antenna mount, and may be used for information, for automatic tracking, or for derivation of bearing rates.

A numerical example will make clear the operation of the embodiment of Figure 1. For illustration, assume the frequency of master oscillator 17 and expander 21 varies uniformly from 2000 C. P. S. to 3000 C. P. S. in synchronism with the rotation of scanning antenna 10 in azimuth from one limiting position to the other. The frequency of oscillator 17, and of expander 21 when triggered by a target echo pulse, will then be 2500 C. P. S. whenever antenna 10 is at the zero bearing position with respect to the antenna mount. If the frequency of oscillator 23 is 3200 C. P. S. and the frequency of oscillator 24 is 1800 C. P. S., then when antenna 10 is at said zero bearing position and a target echo pulse is received the output voltage from band pass filter 27 will have a frequency of 700 C. P. S. (3200 C. P. S. minus 2500 C. P. S.), and the output voltage from band pass filter 28 will also have a frequency of 700 C. P. S. (2500 C. P. S. minus 1800 C. P. S.). The voltage output across terminals 33 and 34 when antenna 10 is directed at a target lying at zero bearing to the antenna mount will therefore be zero, as frequency meters 29 and 30 have identical responses to signals of equal frequencies.

If the target is not at zero bearing from the antenna mount, however, the output voltage across terminals 33 and 34 will indicate by sign and amplitude the bearing of the target with respect to the antenna mount. If the target is at such a bearing that when antenna 10 is pointing at it the frequency of oscillator 17 and expander 21 is, for example, 2800 C. P. S., then at that instant the output voltage of band pass filter 27 will have a frequency of 400 C. P. S. (3200 C. P. S. minus 2800 C. P. S.) and the output voltage of band pass filter 28 will have a frequency of 1000 C. P. S. (2800 C. P. S. minus 1800 C. P. S.). Thus, frequency meter 30 will have a larger output voltage than frequency meter 29, and the sign of the difference between these two voltages will indicate whether the target lies to the right or to the left of zero bearing from the antenna mount.

The operation of the system of Figure 1 will be further explained with reference to Figure 3, which shows the waveforms of various voltages present during such operation.

Figure 3(a) represents the voltage at anode 43 of tube 39 of master oscillator 17. For purposes of illustration, the variation in the periods of successive cycles of this rectangular wave voltage is greatly exaggerated. Figure 3(b) represents the positive voltage pulses which are generated by pulse generator 16 under application of the voltage shown in Figure 3(a).

Figure 3(c) represents the voltage generated simultaneously at anode 47 of tube 38 of oscillator 17. This voltage is differentiated through capacitor 57 and across resistor 58, tube 59 and resistor 60, as described above, to produce across resistor 58 the negative and positive pulses shown in Figure 3(d). Since the resistance of resistor 58 in parallel with the series combination of tube 59 and resistor 60 is less than the resistance of resistor 58 alone, the negative voltage pulses produced across resistor 58 will be of shorter duration than the positive pulses. When these voltage pulses are employed as described above, the voltage produced at control grid 65 of tube 66 of range circuit 18 will have the waveform shown in Figure 3(e).

The voltage on control grid 65 is applied as explained above to grid 82 of tube 83 of range circuit 18. The voltage on grid 82 is represented by Figure 3(f). From this figure it will be seen that when the adjustable bias on grid 82 is varied the time during which tube 83 is cut off will also be varied, and thus also the instant at which the voltage at anode 86 of tube 83 swings negative as the tube resumes conduction. The waveform of the voltage at anode 86 of tube 83 is shown in Figure 3(g).

The waveform of the positive gate voltage appearing at anode 98 of tube 91 and applied to suppressor grid 103 of tube 104 is shown in Figure 3(h).

In addition to exaggerating the rate of variation of frequency of master oscillator 17 in Figure 3, a second assumption is made in this specification for purposes of illustration: It is assumed that a target is present at the selected range over the entire azimuth angle represented in Figure 3. Thus, Figure 3(i) represents the target echo voltages passed through gate 19 and applied to control grid 111 of tube 112, when antenna 10 scans the azimuth sector represented by the voltage in Figure 3(a).

The rectangular wave voltage resulting at anode 122 of tube 113 of expander 21 is represented by Figure 3(j). The output voltage from low pass filter 22 is represented by Figure 3(k). The same exaggerated variation in the period of successive cycles appears in this voltage wave as in the voltage wave shown in Figure 3(a). It will be seen that if only one of the target echo pulses shown in Figure 3(i) were present, due to the narrow directional radiation pattern of scanning antenna 10, then the outputs of expander 21 and low pass filter 22 would contain voltages of only one frequency, and this frequency would uniquely characterize the direction in which antenna 10 was facing at the instant of receiving the echo signal reflected from the target.

Another embodiment of the invention is illustrated in Figure 4. In this embodiment elements 11 through 19 are similar to the same-numbered elements in the embodiment of Figure 1. However, in this embodiment the output from gate 19 is applied to an expander which produces for each echo pulse a voltage pulse of a fixed time duration, which is chosen to be somewhat less than the inverse of the highest pulse repetition rate of transmitter 14.

As shown in Figure 4, the output voltage from gate 19 is impressed on control grid 145 of electron tube 146 and across grid resistor 147. Tubes 146 and 148 comprise an expander similar to expander 21 of the embodiment of Figure 1 except that variable capacitor 118 of the latter is replaced by fixed capacitor 149.

Tube 148 is normally conducting and tube 146 is normally cut off. Conduction switches very rapidly to tube 146 when a positive echo pulse from gate 19 is applied to grid 145 of that tube, and tube 148 is cut off simultaneously by the negative voltage swing from plate 151 of tube 146 which is transmitted to control grid 152 of tube 148 through capacitor 149. This produces a positive voltage swing at plate 153 of tube 148, the duration of which positive pulse is fixed by the time constant of the discharge path of capacitor 149 through grid resistor 154 and through tube 146 while it is conducting. When capacitor 149 has discharged sufficiently that tube 148 switches back to a heavily conducting state, the voltage at plate 153 swings negative.

The plate current through tube 148 changes whenever the voltage at plate 153 changes, although of course with inverse polarity. Since the pulse repetition rate of transmitter 14 is fairly high, D. C. meter 155 in the plate circuit of tube 148 indicates the average plate current flowing in that tube.

The waveform of the voltage output from gate 19, under the same assumptions as made above with reference to Figure 3, is shown in Figure 5(a). Figure 5(b) represents the waveform of the output voltage at plate 153 of tube 148 of the expander in this embodiment. Figure 5(c) represents the waveform of the plate current flowing in tube 148.

The average plate current flowing in tube 148, as indicated by meter 155, is shown in Figure 5(d). It will be seen that in this embodiment the indication of meter 155 uniquely characterizes the direction in which antenna 10 is facing at the instant of receiving the echo signal reflected from the target.

It will be understood that the embodiment shown and described are exemplary only, and that the scope of the invention will be determined with reference to the appended claims.

The invention described herein may be manufactured and used by or for the Government of the United States of America for governmental purposes without payment of any royalties thereon or therefor.

What is claimed is:

1. A radio echo ranging and direction finding system comprising pulse signal transmitting means, radio echo receiving means, directional antenna means for said transmitting and receiving means rotatable with respect to an antenna mount, control means therefor operative to vary the orientation of a singular directional characteristic of the antenna means with respect to the antenna mount, a modulator coupled to said transmitting means and to said control means responsive to the latter to vary the modulation characteristic of said transmitting means in accordance with the variation in orientation of said directional characteristic with respect to the antenna mount, means rendering said echo receiving means operative to receive echo impulses reflected from an object at a selected range only, and a modulation indicator coupled to the output of the receiving means to indicate the modulation characteristics of the echo impulses reflected from said selected range, thereby producing an indication of the bearing of said reflecting object with respect to the antenna mount.

2. A radio echo ranging and direction finding system comprising pulse signal transmitting means, radio echo receiving means, directional antenna means for said transmitting and receiving means rotatable with respect to an antenna mount, control means therefor operative to vary the orientation of a singular directional characteristic of the antenna means with respect to the antenna mount, impulse generator means responsive to said control means to produce a pulse signal whose repetition rate is varied in accordance with the variation in orientation of said directional characteristic with respect to the antenna mount, means operating the transmitting means responsively to said pulse signal, means rendering said echo receiving means operative to receive echo impulses reflected from an object at a selected range only, indicating means operative to indicate the repetition rate of the echo impulses received from said selected range and thereby to indicate the bearing of said reflecting object with respect to the antenna mount.

3. A radio echo ranging and direction finding system comprising pulse signal transmitting means, radio echo receiving means, directional antenna means for said transmitting and receiving means rotatable with respect to an antenna mount, control means therefor operative to vary the orientation of a singular directional characteristic of the antenna means with respect to the antenna mount, impulse generator means responsive to said control means to produce a pulse signal whose repetition rate is varied in accordance with the variation in orientation of said directional characteristic with respect to the antenna mount, means operating the transmitting means responsively to said pulse signal, means rendering said echo receiving means operative to receive echo impulses reflected from an object at a selected range only, means responsive to said received echo impulses from the receiving means to produce a rectangular wave voltage having positive and negative portions of substantially equal time duration in any one cycle and having a frequency equal at any instant to the repetition rate at that instant of said impulse generator means, and indicating means operative to indicate the frequency of the output voltage from said rectangular wave generating means and thereby to indicate the bearing of said reflecting object with respect to the antenna mount.

4. A radio echo ranging and direction finding system comprising pulse signal transmitting means, radio echo receiving means, directional antenna means for said transmitting and receiving means rotatable with respect to an antenna mount, control means therefor operative to vary the orientation of a singular directional characteristic of the antenna means with respect to the antenna mount, impulse generator means responsive to said control means to produce a pulse signal whose repetition rate is varied in accordance with the variation in orientation of said directional characteristic with respect to the antenna mount, means operating the transmitting means responsively to said pulse signal, means rendering said echo receiving means operative to receive echo impulses reflected from an object at a selected range only, means responsive to said received echo impulses from the receiving means to produce a rectangular wave voltage having positive and negative portions of substantially equal time duration in any one cycle and having a frequency equal at any instant to the repetition rate at that instant of said impulse generator means, low pass filter means operative to reject all sine wave voltages in the output voltage from said rectangular wave generating means having frequencies other than the fundamental frequency and to pass the sine wave voltage of that frequency, and indicating means operative to indicate the frequency of the output voltage from said low pass filter means and thereby to indicate the bearing of said reflecting object with respect to the antenna mount.

5. A radio echo ranging and direction finding system comprising, a radio frequency transmitter for periodically emitting radio frequency impulses, means for confining said pulses to a unidirectional path, a receiver for receiving said impulses after reflection from remote objects, means for rotating said first named means about a reference point, a modulator coupled to said transmitter for periodically pulsing the same, a pulse rate control means for said modulator coupled to said first named means and operable to vary the pulse rate of said transmitter in accordance with the orientation of said first named means relative to a reference angle and a frequency indicator coupled to the output of the receiver to indicate the repetition frequency of the received impulses.

6. A radio echo ranging and direction finding system comprising, a radio frequency transmitter for periodically emitting radio frequency impulses, means for confining said pulses to a unidirectional path, a receiver for receiving said impulses after reflection from remote objects, means for rotating said first named means about a reference point, a modulator coupled to said transmitter for periodically pulsing the same, a pulse rate control means for said modulator coupled to said first named means and operable to vary the pulse rate of said transmitter in accordance with the orientation of said first named means relative to a reference angle and means coupled to the output of the receiver for producing a direct current voltage varying in dependency upon the repetition rate of the received impulses.

7. A radio echo ranging and direction finding system comprising, a directional antenna, a radio frequency transmitter coupled to said antenna for periodically emitting radio frequency impulses, a receiver for receiving said impulses after reflection from remote objects, means for rotating said antenna in azimuth, transmitter pulse rate control means coupled to said antenna for varying the repetition rate of said transmitter in accordance with the orientation of said antenna relative to a reference angle, and means coupled to said receiver to indicate the repetition frequency of the received impulses.

References Cited in the file of this patent

UNITED STATES PATENTS

| 2,405,930 | Goldberg et al. | Aug. 13, 1946 |
| 2,406,316 | Blumlein et al. | Aug. 27, 1946 |
| 2,406,468 | Loughlin | Aug. 27, 1946 |
| 2,415,095 | Varian | Feb. 4, 1947 |
| 2,448,016 | Busignies | Aug. 31, 1948 |
| 2,450,005 | Labin | Sept. 28, 1948 |
| 2,450,945 | Eaton | Oct. 12, 1948 |
| 2,509,207 | Busignies | May 30, 1950 |
| 2,520,166 | Page | Aug. 29, 1950 |
| 2,523,455 | Stewart | Sept. 26, 1950 |